July 19, 1966     W. J. COOPER     3,261,385
SAW CHAIN AND CUTTER LINK
Filed March 9, 1965     2 Sheets-Sheet 1
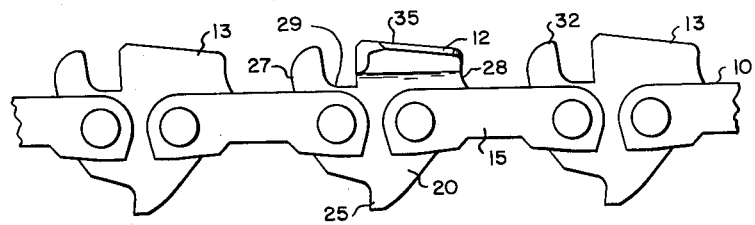
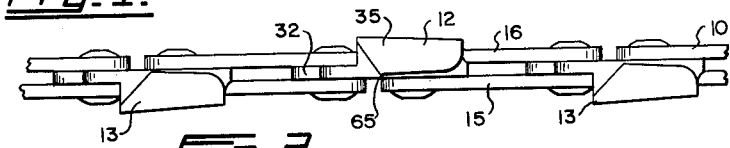
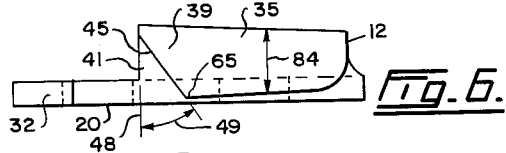
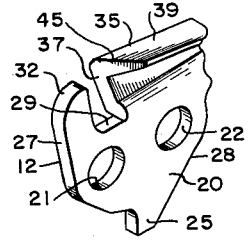
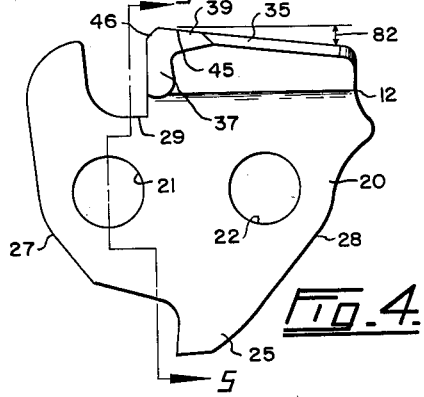
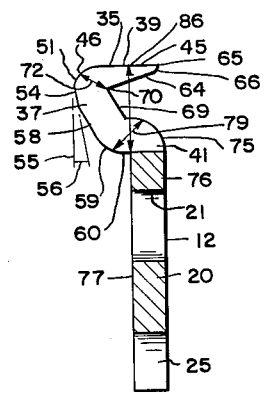
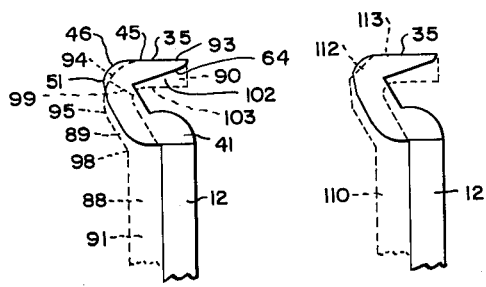
INVENTOR
WILLIAM J. COOPER
BY
Fetherstonhaugh & Co.
ATTORNEYS July 19, 1966  W. J. COOPER  3,261,385
SAW CHAIN AND CUTTER LINK
Filed March 9, 1965  2 Sheets-Sheet 2

INVENTOR
WILLIAM J. COOPER
BY
Fetherstonhaugh & Co.
ATTORNEYS

United States Patent Office 3,261,385
Patented July 19, 1966

3,261,385
SAW CHAIN AND CUTTER LINK
William J. Cooper, 935 Como Lake Ave.,
New Westminster, British Columbia, Canada
Filed Mar. 9, 1965, Ser. No. 444,891
8 Claims. (Cl. 143—135)

This invention relates to improved cutter links for saw chains and chains incorporating these links.

An object of the present invention is the provision of a cutter link for saw chains that makes said chains cut faster and smoother than the chains now on the market.

Another object is the provision of saw chains having improved stability as compared to the known chains.

A further object is the provision of cutter links requiring less sharpening than is normally expected, and are easier to sharpen.

The present cutter link is of the type that cuts across the bottom of the kerf in the wood and along the sides of said kerf. Most cutter links of the prior art are side links, although some attempt has been made to put the cutters on the centre links. It is obvious that a chain with the cutters on the centre links would be more stable than one with the cutters on the side links, in view of the fact that in the latter case, the cutting action takes place on opposite sides of the longitudinal centre plane of the chain. However, with the prior cutter constructions, it was necessary to make the cut higher relative to the main body of the chain when these cutters were put on the centre links. This had the effect of offsetting the stability gained by putting the cutters on the centre links since the higher the cutter relative to the chain body, the less stable the cutter is.

Although the present cutter link may be used as a side cutter, it is preferable to use it as a centre cutter, since the construction is such that the cutter can be made no higher than the prior cutter on the side links. As a result of this, the present cutter attains the stability in the chain which should be available when centre cutters are used.

Another advantage of the present cutter results from the fact that it has a shorter cutting edge than the cutter links at present on the market. This reduces the resistance to the chain as it moves through the wood so that the chain cuts faster than would otherwise be the case, and this allows for a reduction in power or for the operation at higher cutting speeds with a shortening of the cutting time.

The present cutter link has a cutter comprising a shank inclined outwardly from an edge of a flat body, and a toe extending from said shank back towards the plane of the link body. The cutter links now on the market have the same general construction, but they are comparatively thin at the junction of the shank and toe with the result that the toes often break off. On the other hand, the construction of the present cutter is such that it is comparatively thick at the junction of the shank and toe so that it stands up to hard usage better than the prior cutters. The present construction also provides for a strong connection between each shank and the body of its link.

The cutters of the prior art have outer surfaces that incline from a transverse leading cutting edge inwardly towards the body of the tooth. As a result of this, the space between the toe of the cutter and the body of the cutter link diminishes in vertical section from the forward to the rearward edge of the cutter. This tapered space in some woods has a tendency to clog with sawdust. The present cutter is so formed that the space between the toe of the cutter and the link body is substantially the same size in vertical section at the rearward end of the cutter as at the forward end thereof so that clogging does not take place.

When it is desired to file or sharpen the cutting edge of a cutter of the prior art, it is necessary to hold the file against the cutting edge and in a direction away from the body of the chain to get the desired undercut effect. With the present tooth, a shoulder is provided which guides the file into the correct position relative to the cutting edge of the cutter so that it is only necessary to press the file against said cutting edge.

Examples of this invention are illustrated in the accompany drawings, in which:

FIGURE 1 is a side elevation of an improved saw chain;

FIGURE 2 is a plan view of the chain;

FIGURE 3 is a perspective view of a cutter link used in this chain;

FIGURE 4 is an enlarged side elevation of the cutter link;

FIGURE 5 is a vertical section taken on the line 5—5 of FIGURE 4;

FIGURE 6 is an enlarged plan view of the cutter link;

FIGURE 7 is a diagrammatic front elevation of this link superimposed on the prior cutter link generally on the market today;

FIGURE 8 is a view similar to FIGURE 7 with this link superimposed on another type of prior cutter link;

Figure 9:
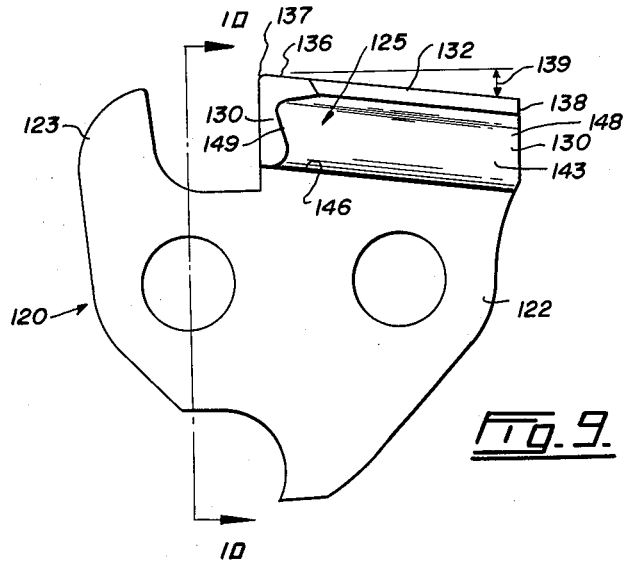
FIGURE 9 is a side elevation of an alternative form of cutter link.

Referring to FIGURES 1 and 2 of the drawings, 10 is an improved saw chain made up of a plurality of right hand and left hand cutter links 12 and 13, respectively, which are interconnected in the chain by suitable pairs of side links 15 and 16. Cutter links 12 and 13 may be directly connected together by a pair of side links 15 and 16, as shown, or there may be other blank links provided in the chain between each pair of right hand and left hand cutter links. As links 12 and 13 are identical, excepting that one is a right hand and the other a left hand cutter, only one, namely link 12, will now be described in detail.

Cutter link 12 is clearly illustrated in FIGURES 3 to 6. Link 12 includes a flat body 20 having holes 21 and 22 therethrough adjacent opposite ends thereof through which rivets extend hingedly to connect side links to the body. A driving lug 25 projects from an edge of body 20 in accordance with standard practice. The body has a forward end 27, a rearward end 28 and an outer edge 29. A depth gauge 32 projects outwardly from body edge 29 adjacent the forward end 27 thereof. A cutter 35 projects outwardly from edge 29 of the link body, spaced rearwardly from depth gauge 32, as clearly shown in FIGURE 4.

Cutter 35 is made up of a shank 37 inclined generally outwardly and laterally from the plane of body 20, see FIGURE 5, and a toe 39 formed on an outer edge of said shank and extending inwardly therefrom over body 20 generally normal to the plane of the body. Actually, shank 37 is offset laterally to body 20, and is connected to the latter by a connector 41.

Toe 39 is formed with a transverse cutting edge 45 on the forward edge thereof relative to the direction of movement of the tooth, and terminating in a short cutting curve 46 which extends slightly inwardly of said cutting edge towards shank 37. It is preferable to have cutting edge 45 extend across cutter 35 at an angle to a plane normal to the plane of body 20, said normal plane being indicated by 48 in FIGURE 6. It is preferable to have cutting edge 45 extend generally at an angle of approximately 35° to plane 48, said angle being indicated at 49 in FIGURE 6. It is important that cutting curve terminates at 51 in FIGURE 5.

Shank 37 has an outer surface 54 inclined inwardly under short cutting curve 46 and towards the plane of body 20. It is desirable that surface 54 be inclined inwardly from the termination of curve 46 only a little from the vertical plane 55, shown in FIGURE 5, the angle of inward incline being indicated at 56 in this figure. It is preferable, although not absolutely essential, to provide a second outer surface 58 inclined inwardly relative to said first inclined surface 54. This second surface 58 terminates laterally of body 20 at 59 to form a shoulder 60 projecting laterally from body 20 and actually forming part of connector 41.

Toe 39 has an inner generally transverse surface 64 inclined from the free side edge 65 of said toe towards the body and extending to shank 37. It is preferable to join surface 64 to side edge 65 by a curve 66. Shank 37 has an inner surface 69 extending from the point of junction 70 with the toe inner surface 64 towards body 20 and the vertical plane of said body. Surface 69 may also incline a little towards outer surface 58 of said shank. In view of the fact that outer surface 54 of the shank is inclined inwardly only a little relative to vertical plane 55, cutter 35 is relatively thick between the junction 70 of inner surfaces 64 and 69 and the short cutting curve 46, as indicated at 72 in FIGURE 5.

Connector 41 is formed with an inner surface 75 that curves from the inner shank surface 69 to the side 76 of body 20, the line of intersection between surfaces 69 and 75 being offset laterally to the left beyond the plane of side 77 of the body. It will be noted that the opposite surface 60 of connector 41 extends from outer surface 58 of the shank to side 77 of the link body and is substantially normal to the plane of the body adjacent the line of intersection between surface 60 and side 77. The curved surface 75 of connector 41 results in the cutter being relatively thick across said connector, as indicated at 79, where shank 37 is connected to edge 29 of body 20.

By referring to FIGURE 4, it will be seen that toe 39 slopes inwardly from its forward end at cutting edge 45, as indicated by angle 82. Furthermore, it is preferable to make said toe gradually narrower transversely, as indicated at 84 in FIGURE 6, toward its rearward end.

By referring to FIGURE 5, it will be seen that cutter 35 is relatively squat, that is, it does not project outwardly very far from link body 20, said distance being indicated by line 86 in said figure. Cutting edge 45 is substantially normal to the vertical plane of body 20, and there is only the slight curve 46 at the end of said cutting edge. The construction of this cutter makes it possible to form it without projecting as far outwardly from the link body as is customary and necessary with the cutters of this particular type in the prior art.

FIGURES 7 and 8 are included to illustrate diagrammatically the difference between cutter 35 and the prior art. FIGURE 7 compares the present cutter with a cutter 88 of a type which is mostly used on the market today. Cutter 88 has a shank 89 and a toe 90. It will be noted that the body 91 of cutter 88 is located to one side of body 20. The reason for this is that cutter 88 is a side cutter and cannot be successfully used as a centre cutter. Toe 90 has a transverse cutting edge 93 which extends across the forward end of the cutter and curves downwardly at 94 to a point at 95. It is obvious that cutting edge 93, extending around curve 94 to 95 is considerably longer than present cutting edge 45 that extends around short curve 46 and terminates at 51. As a result of this short cutting edge, the resistance is considerably less than with cutter 88 so that the chain can, with a given amount of power, travel faster. The long curve 94 of cutter 88 engages the wood in a position in which it takes a very fine cut. This is more of a rubbing action which increases resistance and wears away the cutting edge very rapidly. Therefore, this long cutting edge requires more filing than the present shorter cutting edge and it still does not cut as fast as cutter 35. Furthermore, the construction of cutter 88 with its comparatively long curve 94 results in shank 89 joining body 91 at 98 which is below connector shoulder 41 of cutter 35. With this construction, cutter 88 cannot be shifted in and used as a centre cutter since the lower portion of the shank will not clear the side links. This means that if cutter 88 is to be used as a centre cutter, body 91 needs to be heightened in order to ensure shank 88 clearing the side links, and this results in the toe 90 being raised since the long curve 94 cannot be eliminated. This heightening of cutter 88 makes it unstable as a centre cutter. Furthermore, cutter 88 is relatively weak across the curve between the toe and shank, indicated at 99, as compared to the present cutter at the corresponding section thereof. It will be noted that the inclined inner surface 64 of toe 39 leaves much more space at 102 for the clearance of sawdust and chips than the inner surface 103 of cutter 88.

FIGURE 8 compares another prior cutter 110 with cutter 35. Cutter 110 is only slightly different from cutter 88, and has all the disadvantages of the latter. The main difference between cutters 88 and 110 is that the latter has an angular cutting edge 112 at the inner end of transverse cutting edge 113 as compared to the curved cutting edge 94 of cutter 88.

One of the advantages of cutter 35 over the prior art is that when it is filed transversely of a cylindrical file to undercut toe 39 to produce cutting edges 45 and 46, the file rests on connector shoulder 41 so that it is only necessary to press the file towards toe 39 at the proper angle properly to sharpen edges 45 and 46. With the cutters of the prior art, there is no equivalent of connector shoulder 41 so that it is necessary to press the files rearwardly and upwardly against the toes and shanks in order to create the relatively long cutting edges.

Figure 11:
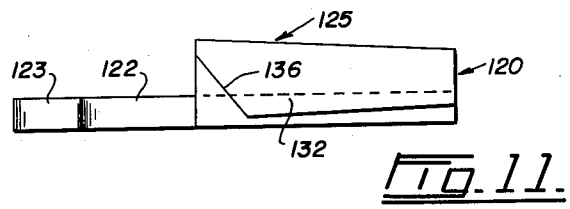
FIGURE 11 is a plan view of the cutter of FIGURE 10.
Figure 10:
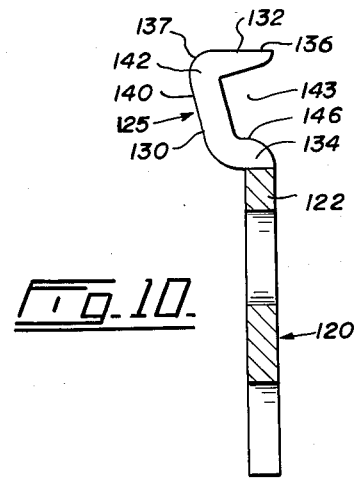
FIGURE 10 is a section taken on the line 10—10 of FIGURE 9.

FIGURES 9 to 11 illustrate an alternative form of cutter link 120 which is similar to but slightly different from cutter link 12. Link 120 includes a flat body 122 with a depth gauge 123 projecting outwardly from an edge thereof near one end, and a cutter 125 projecting outwardly from the same edge spaced rearwardly from said depth gauge.

Cutter 125 includes a shank 130 inclined generally outwardly and laterally from the plane of body 122, see FIGURE 10, and a toe 132 formed on an outer edge of said shank and extending inwardly therefrom over body 122 generally normal to the plane of said body. Shank 130 is offset laterally from body 122, and is connected thereto by a connector 134.

Toe 132 is shaped the same as toe 39, and has a transverse cutting edge 136 on the forward edge thereof, said transverse cutting edge preferably terminating in a short cutting curve 137 which extends slightly inwardly of the cutting edge towards shank 130. The toe is longitudinally inclined inwardly towards body 122 from its transverse cutting edge 136 to a rearward edge 138, as indicated at 139 in FIGURE 9.

Shank 130 does not include the equivalent of second outer surface 58 of cutter 35, but in effect, the inclined surface 54 of the latter cutter has been extended all the way to connector 134 in an inclined surface 140. In other words, shank 130 is not inclined inwardly from its outer edge as much as shank 37 of cutter 35. This does not affect the thickness of the cutter at junction 142 between toe 132 and shank 130, but it does result in a larger space 143 beneath toe 132 than the corresponding space in the previous cutter, as can clearly be seen by comparing FIGURES 5 and 10. By referring to FIG- URE 9, it will be seen that cutter link 120 is so formed that the upper surface 146 of connector 134 is longitudinally inclined rearwardly of the cutter substantially parallel with inclined toe 132. As a result of this, space 143 is as large in vertical section at its rearward end 148 as it is at the forward end 149 thereof.

As previously stated, cutter 125 of cutter link 120 is quite similar to cutter 35 of link 12. The main difference is that the outer surface 140 of shank 130 does not incline inwardly as much as surface 58 of shank 37 in cutter 35 so that space 143 beneath toe 132 is larger, although the height of the toe from body 122 has not been increased. Thus, the clearance for sawdust or chips within the cutter has been increased, and the cutter has been further improved by inclining the surface 146 of connector 134 so that end 148 of space 143 is the same size in vertical section as end 149 of said space.

What I claim as my invention is:

1. A saw chain cutter link comprising a flat body adapted to fit into and form part of a saw chain, and a cutter on and projecting from an edge of said body, said cutter comprising a shank inclined generally outwardly and laterally from the plane of the body, a toe formed on an outer edge of said shank and extending inwardly therefrom over the body generally normal to the body plane, said toe having a transverse cutting edge on a forward edge thereof extending from a free side edge of the toe towards the shank, said toe having an inner generally transverse surface inclined from said free side edge towards the body and extending to the shank, said shank having an inner surface extending from said inner toe surface towards the body and the plane of the latter, said shank being offset laterally relative to the body and joined thereto by a connector having an outer surface extending inwardly from the outer surface of the shank to a first side of the body, said outer surface being substantially perpendicular to the plane of the body adjacent the line of intersection of the said connector outer surface and the first side of the body, and said connector having an inner surface substantially continuously curved from the inner surface of the shank to the opposite side of the body, the line of intersection between the connector inner surface and shank inner surface being laterally offset from the plane of the body beyond the said first side of the body.

2. A saw chain cutter link as claimed in claim 1 wherein the said transverse cutting edge of the toe terminates in a short cutting curve extending slightly inwardly of said cutting edge towards the shank, and said shank has an outer surface inclined inwardly under said short cutting curve and towards said body plane, whereby the cutter is relatively thick between the short cutter and the junction between the toe and the shank inner surface.

3. A saw chain cutter link as claimed in claim 2 wherein said toe is longitudinally inclined inwardly towards the body from said cutting edge towards a rearward edge of the toe, and said connector inner surface is also inclined longitudinally so as to be parallel with the toe to form a space between the body and the toe having rearward and forward ends of the same size and vertical section.

4. A saw chain cutter link as claimed in claim 1 wherein said toe is longitudinally inclined inwardly towards the body from said cutting edge towards a rearward edge of the toe, and said connector inner surface is also inclined longitudinally so as to be parallel with the toe to form a space between the body and the toe having rearward and forward ends of the same size and vertical section.

5. A saw chain including a plurality of centre cutter links having flat bodies interconnected into a chain by side links, some of said cutter links having right hand cutters and others being left hand cutters, and a cutter on and projecting from an edge of each link body; each cutter comprising a shank inclined generally outwardly and laterally from the plane of the body, a toe formed on an outer edge of said shank and extending inwardly therefrom over the body generally normal to the body plane, said toe having a transverse cutting edge on a formed edge thereof extending from a free side edge of the toe toward the shank, said toe having an inner generally transverse surface inclined from said free side edge towards the body and extending to the shank, said shank having an inner surface extending from said inner toe surface towards the body and the plane of the latter, each shank being offset laterally to the body of its cutter link and joined to said body by a connector having an outer surface extending inwardly from the outer surface of the shank to a first side of the body, said outer surface being substantially perpendicular to the plane of the body adjacent the line of intersection of the said connector outer surface and the first side of the body, and said connector having an inner surface substantially continuously curved from the inner surface of the shank to the opposite side of the body, the line of intersection between the connector inner surface and shank inner surface being laterally offset from the plane of the body beyond the said first side of the body.

6. A saw chain cutter link as claimed in claim 5 wherein the said transverse cutting edge of the toe terminates in a short cutting curve extending slightly inwardly of said cutting edge towards the shank, and said shank has an outer surface inclined inwardly under said short cutting curve and towards said body plane, whereby the cutter is relatively thick between the short cutter and the junction between the toe and the shank inner surface.

7. A saw chain cutter link as claimed in claim 6 wherein said toe is longitudinally inclined inwardly towards the body from said cutting edge towards a rearward edge of the toe, and said connector inner surface is also inclined longitudinally so as to be parallel with the toe to form a space between the body and the toe having rearward and forward ends of the same size and vertical section.

8. A saw chain cutter link as claimed in claim 5 wherein said toe is longitudinally inclined inwardly towards the body from said cutting edge towards a rearward edge of the toe, and said connector inner surface is also inclined logitudinally so as to be parallel with the toe to form a space between the body and the toe having rearward and forward ends of the same size and vertical section.

References Cited by the Examiner

UNITED STATES PATENTS

| | | |
|---|---|---|
| 2,652,076 | 9/1953 | Bye. |
| 2,658,537 | 11/1953 | Ackley. |
| 2,725,083 | 11/1955 | Ackley. |
| 2,872,956 | 2/1959 | Gudmundsen. |

DONALD R. SCHRAN, *Primary Examiner.*